Oct. 16, 1928.
C. A. GILLINGHAM
1,688,073
PRIMARY CELL
Filed Jan. 21, 1926
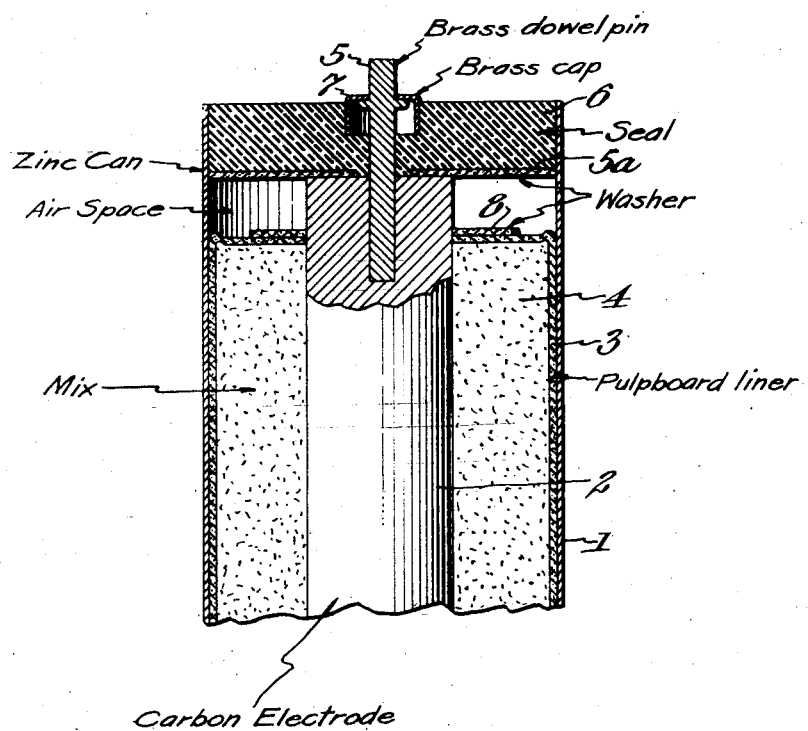
Inventor:
Charles A. Gillingham,
By Byrnes Townsend & Brickenstein
Attorneys Patented Oct. 16, 1928.

1,688,073

UNITED STATES PATENT OFFICE.

CHARLES A. GILLINGHAM, OF LAKEWOOD, OHIO, ASSIGNOR TO NATIONAL CARBON COMPANY, INC., A CORPORATION OF NEW YORK.

PRIMARY CELL.

Application filed January 21, 1926. Serial No. 82,780.

This invention relates to primary cells and particularly to dry cells of the Leclanché type. An object of the invention is to provide a free gas space above the deporlarizing mix. A further object is to provide means for sealing the cell so as to prevent the leakage of electrolyte between the carbon electrode and the sealing material.

The invention consists broadly in using a carbon electrode terminating below the top of the zinc cup and serving to support an annular disk which carries the seal and provides a free gas space above the depolarizing mix.

Reference is to be made to the accompanying drawing, illustrating a preferred embodiment of the invention.

The cell, as shown, comprises a zinc container electrode 1, a carbon electrode 2, a bibulous lining of pulp board or similar material 3, and tightly packed depolarizing mix 4. The carbon electrode terminates some distance below the top of the zinc container and is provided with a brass dowel pin 5 which is embedded at one end in the top of the carbon electrode and at the other end extends above the edge of the zinc container to serve as one of the cell terminals. A disk 5ª of relatively stiff insulating material of such size as to closely fit within the zinc container is positioned upon the end of the carbon electrode and serves to define the upper boundary of the gas space  nd to support a layer of sealing material 6. A hole is provided in the center of the disk to permit of its being fitted over the dowel pin in the carbon electrode and to permit the sealing material to flow in around the dowel pin to protect it from corrosion by electrolyte, should the latter accumulate in the gas space and find its way between the disk and the top of the carbon electrode. A brass cap 7 is fitted over the dowel pin and embeded in the sealing material as shown. In the embodiment of the invention shown in the drawing, an annular disk 8 is fitted about the carbon electrode to hold the overturned edges of the pulp board lining down upon the upper surface of the depolarizing mix. In this way any tendency of the mix to be jarred loose during handling of the cell is reduced. However, this disk may be dispensed with without sacrificing the principal advantages of the invention.

According to the invention the plastic seal is supported on a disk, and the latter is positively supported and spaced from the depolarizing mix by a simple and strong construction which permits a gas space of any desired size to be provided.

By using a carbon electrode terminating below the top of the zinc container electrode and flowing sealing material over the top of the carbon electrode and about the dowel pin or other metallic connection leading to the corresponding cell terminal the creeping of electrolyte either through the porous carbon electrode or between it and the sealing material to the terminal is substantially prevented.

In addition to the advantages of the invention which are pointed out above, the construction shown and described is easy to assemble and permits of marked economies in manufacture.

While the invention has been described with particular reference to its application to a cell of the lined type, it is to be understood that it is applicable to other types of dry cells, for example, the so-called "bag" or bobbin type.

I claim:

1. A dry cell comprising a zinc cup, a carbon rod electrode therein terminating below the top of the zinc cup, seal supporting means resting on the top of said carbon electrode and sealing means above said seal supporting means and joined to said carbon electrode.

2. A dry cell comprising a zinc cup, depolarizing mix and a carbon rod electrode projecting above the depolarizing mix but terminating below the top of the zinc cup, seal supporting means supported by said carbon electrode, and sealing means supported by said supporting means and joined to said carbon electrode said means defining an annular gas space around the carbon electrode bove the depolarizing mix.

3. A dry cell comprising a zinc cup having a bibulous lining, a carbon electrode therein terminating below the top of the zinc cup, depolarizing material tightly packed in the space between the lining and the carbon electrode, an annular member resting on said carbon electrode and sealing means supported by said annular member and joined to said carbon electrode, said means defining an annular gas space around the carbon electrode above the depolarizing material.

4. A dry cell comprising a zinc cup having a bibulous lining, a carbon rod electrode therein terminating below the top of the zinc cup, battery mix tightly packed in the lined cell around the electrode, the said bibulous lining extending across the top of the mix and surrounding the electrode at a point some distance from its upper end, a disk of insulating material resting upon the electrode and defining an annular gas space above the battery mix, and a seal in the cup on top of said disk.

In testimony whereof, I affix my signature.

CHARLES A. GILLINGHAM.